Patented Apr. 20, 1943

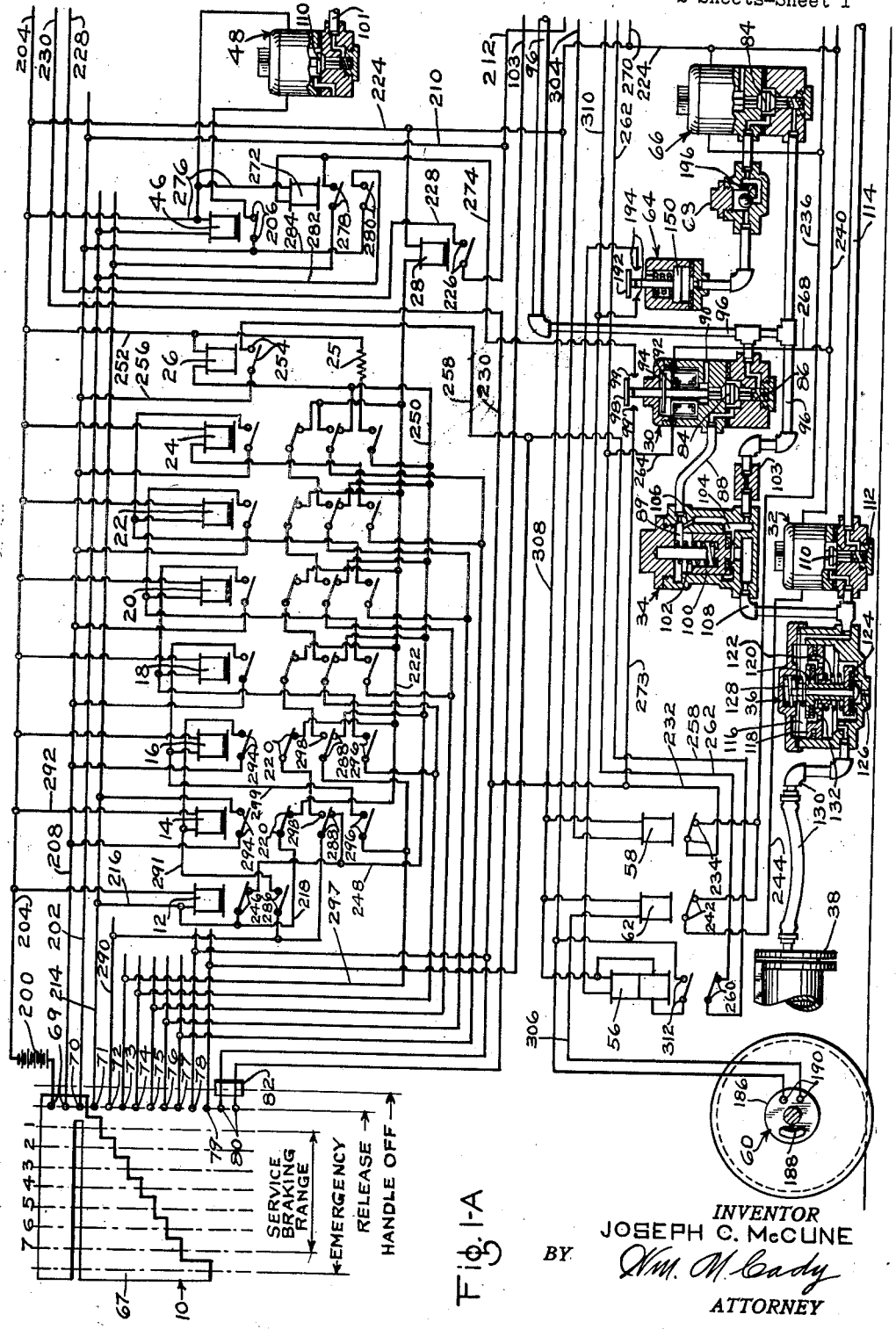

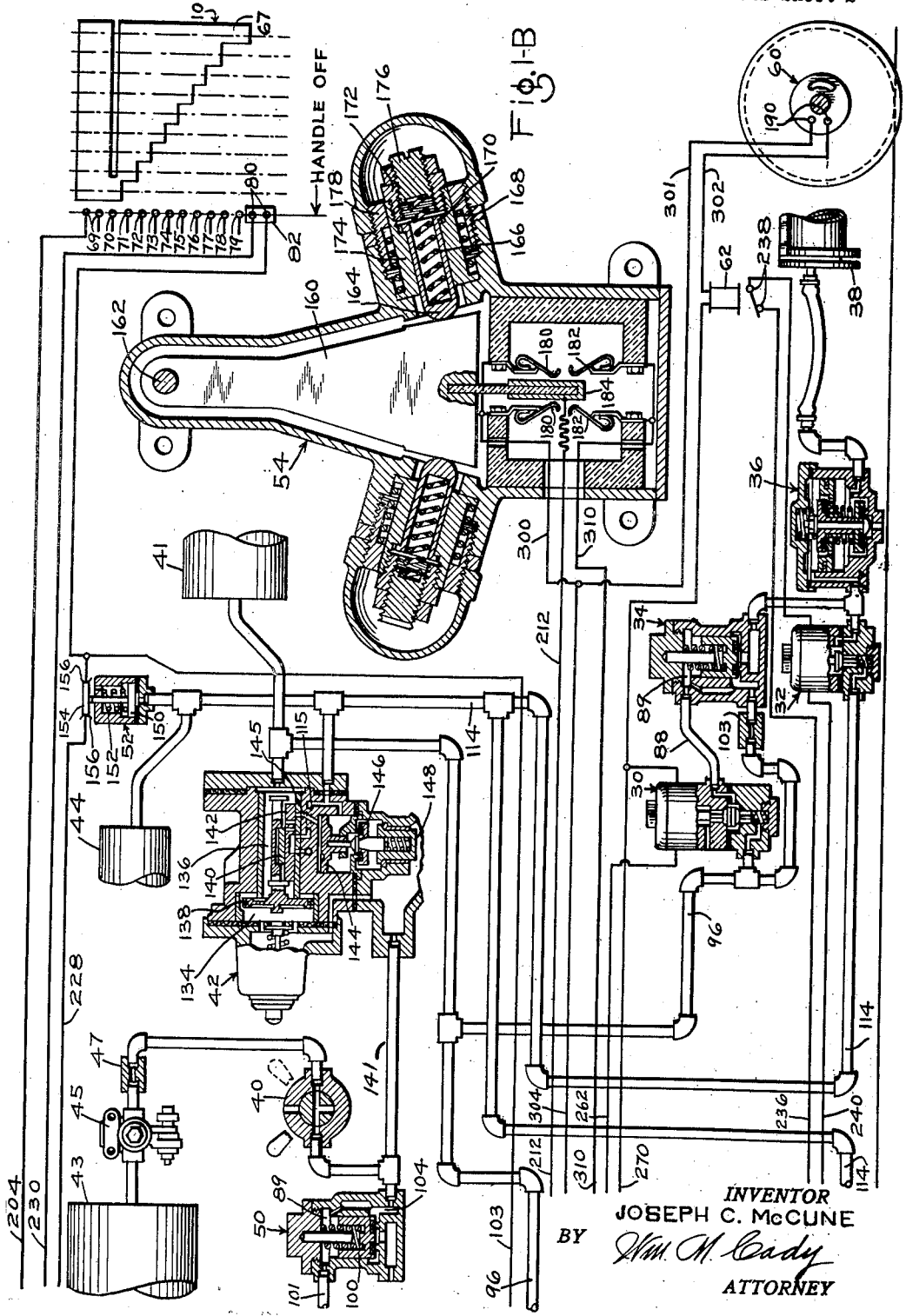

2,317,134

UNITED STATES PATENT OFFICE 2,317,134

ELECTROPNEUMATIC BRAKE

Joseph C. McCune, Edgewood, Pa., assignor to The Westinghouse Air Brake Company, Wilmerding, Pa., a corporation of Pennsylvania Application February 24, 1934, Serial No. 712,733

55 Claims. (Cl. 303—24)

This invention relates to electro-pneumatic brakes, and in particular to electro-pneumatic brakes for railway trains, traction vehicles, and the like.

Modern conditions require that fast schedules be maintained on railway and traction systems. To maintain such fast schedules, it is necessary that equipment be provided for bringing the train, or vehicle, to a stop in a minimum length of time. If fluid pressure operated brake equipment is employed, when an application of the brakes is made the brake cylinder pressure must be built up at a very rapid rate; and when the brakes are released, the pressure in the brake cylinders must be released to the atmosphere at a corresponding fast rate.

Although the brake cylinder pressure must be built up rapidly to effect a quick stop, the final pressure must not be such as to cause sliding of the wheels. It is, therefore, highly desirable that the operator have sufficient control over the rise of brake cylinder pressure so that he may accurately control the ultimate value to which it may attain. In addition to providing for this control by the operator, it is desirable that the maximum rate of retardation be limited to some value below which proper handling of the train is assured.

These provisions are readily attained in an electro-pneumatic brake equipment, and it is, therefore, an object of my invention to provide an electro-pneumatic brake equipment in which the build up of brake cylinder pressure, and the release of pressure from the brake cylinders, are automatically controlled, with means under control of the operator for controlling the final pressure in the brake cylinders.

Another object of my invention is to provide means for limiting the rate of retardation, due to application of the brakes, to maximum values, a high maximum rate being permissible at the higher speeds and a low maximum rate being permissible at the lower speeds. By limiting the maximum rate of retardation in this manner greater comfort to the passengers results when bringing the train or vehicle to a stop.

A yet further object is to provide an electropneumatic brake equipment having provision for releasing the brakes on individual pairs of wheels which begin to slide, and for maintaining this release until the wheels commence to roll again according to the speed of the vehicle.

Still another object is to provide an electropneumatic brake equipment having means for applying the brakes pneumatically, which means automatically becomes effective to apply the brakes in case of failure of power to operate the electro-pneumatic equipment, and which may also be operated manually, independently of the electro-pneumatic equipment.

Yet further objects and advantages of my invention will be apparent from the following description, which is taken in connection with the attached drawings, wherein Figs. 1—A and 1—B taken together represent an embodiment of my invention as applied to a single vehicle. It will, however, be apparent as my invention is more fully described that it may be equally well adapted to control the brakes throughout a complete railway train.

In the embodiment shown, the electro-pneumatic control equipment includes controllers or sequence switches 10, either of which may be operated to control all applications of the brakes, timing relays 12, 14, 16, 18, 20, 22 and 24 inclusive, a master application relay 26, a master release relay 28, application magnet valve devices 30, release magnet valve devices 32, application valve devices 34, and quick release valve devices 36, all cooperating to control the supply of fluid under pressure to and its release from brake cylinders 38, it being proposed to provide a brake cylinder for each pair of wheels. Only two brake cylinders are shown in order to simplify the explanation of my invention, but it will be obvious that any number may be used.

For effecting an application of the brakes when the electro-pneumatic control is ineffective, I have provided a pneumatic control equipment including a brake valve device 40, a triple valve device 42, and a brake cylinder volume reservoir 44.

Fluid under pressure for operating the brakes is supplied from an auxiliary reservoir 41, which is recharged from a main reservoir 43 through the triple valve device 42 in the usual manner. A feed valve device 45 is provided for maintaining the desired pressure, and a choke plug 47 having a restricted port is provided for restricting the flow of fluid from the main reservoir to the auxiliary reservoir side of the feed valve device.

For preventing operation of the pneumatic control equipment when the electro-pneumatic control equipment is operable, but providing for automatic operation thereof when the electro-pneumatic control fails, there is provided a slow-release, interlock relay 46, a magnet valve device 48, and an application valve device 50. For preventing undesired operation of the electro-pneumatic control equipment when the pneumatic control equipment is operable, there is provided an interlocking pneumatic relay device 52.

In order to limit the maximum rate of retardation which may be effected by application of the brakes, there is provided a retardation controller device 54 and relays 56 and 58.

For releasing the brakes on individual pairs of wheels should one or both of the wheels begin to slide, there is provided a contact mechanism 60, which is associated with each pair of wheels, relays 62, a pneumatic relay 64, a timing magnet valve device 66, and a ball check valve and choke device 68.

A controller or sequence switch 10 may be provided at each end of the vehicle so that the brakes may be controlled from either end. These controllers are preferably of the drum type having a movable or rotatable drum, diagrammatically indicated at 67, which is adapted to engage a plurality of fingers, diagrammatically indicated at 69 to 80 inclusive.

The drum 67 is adapted to have an off position, a release position, a plurality of service braking positions, and an emergency position. In the embodiment shown, provision has been made for seven service braking positions. When the brakes are controlled from one end of the car the controller at the other end is placed in the off position. In this position a segment 82 bridges the fingers 80, thereby completing the circuit for the control at the other end.

When the controller at the controlling end is in release position, the drum 67 is in engagement with the fingers 69 and 70. When the drum is moved through the "Service Braking Range," it sequentially engages fingers 71 to 77, inclusive, to sequentially energize timing relays 12, 14, 16, 18, 20, 22 and 24, inclusive, as will be described more fully presently. When the drum is moved to emergency position, it simultaneously engages fingers 78 and 79. When the drum is moved from release to any of the service braking positions, or to emergency position, it disengages from the finger 70.

The timing relays 12, 14, 16, 18, 20, 22 and 24 operate to control the build up of brake cylinder pressure, and the release of pressure from the brake cylinder, in cooperation with the master application relay 26 and the master release relay 28. The manner in which these relays operate, and the results accomplished thereby, will be described more fully later.

Each of the application magnet valve devices 30 is embodied in a casing provided with a double beat valve 84 which is urged to upper seated position by a spring 86. The double beat valve is urged to a lower seated position by an electromagnet having winding 92, which when energized attracts there toward an armature 94, which is secured to the valve stem. Movement of the valve stem of the left hand magnet valve device downwardly, also causes engagement of movable contact 96, secured thereto and insulated therefrom, with stationary contacts 98, for a purpose which will appear later.

The application magnet valve devices control the supply of fluid under pressure from the auxiliary reservoir 41 to chambers 89 in the application valve devices 34, by way of pipes 88 and 96. Each application magnet valve device also controls the release of fluid pressure from this chamber to the atmosphere by way of port 90 in its casing.

The application valve devices 34 are adapted to control the supply of fluid under pressure from the auxiliary reservoir 41 to the brake cylinders 38 by way of the quick release valve devices 36.

Each of the application valve devices is embodied in a casing defining the aforementioned chamber 89, in which is disposed a valve 100 urged toward seated position by a spring 102. The upper portion of the chamber 89 is connected with a lower chamber 104 by an equalizing choke passage 106. The chamber 104 is connected with the auxiliary reservoir 41 through a choke plug 108 having a restricted port, and through pipe 96.

When the valve 84 of each application magnet valve device 30 is in its upper seated position, fluid under pressure is supplied to both chambers 89 and 104 from the auxiliary reservoir 41. With the pressure in both of these chambers substantially equal, the spring 102 maintains the valve 100 in seated position.

When the pressure in the chamber 89 above the valve 100 is reduced, as by movement of the valve 84 to its lower seated position, which thereby releases the pressure in the chamber 89 to the atmosphere, the pressure in chamber 104 unseats the valve 100, and fluid under pressure flows from the chamber 104, and the auxiliary reservoir 41, past the unseated valve 100 to a chamber 116 in the quick release valve device 36, by way of pipe 108.

When the pressure in the chamber 89 above the valve 100 is restored to a value substantially equal to that in the chamber 104, the spring 102 will seat the valve 100. The equalizing choke 106 serves to maintain the pressure in the two chambers substantially equal, but is small enough to prevent rapid equalization when the pressure in the chamber 89 is suddenly reduced.

Each of the release magnet valve devices 32 is embodied in a casing provided with a valve 110 which is urged to unseated position by a spring 112. The valve 110 is urged to its seated position by an electro-magnet in the upper part of the casing, which when energized operates to seat the valve in the manner described in connection with the application magnet valve devices 30. The release valve devices 32 function to control the release of fluid pressure from the chambers 116 in the quick release valve devices 36 to the atmosphere, by way of pipe 114 and the triple valve device 42.

Each quick release valve device 36 is embodied in a casing defining the aforementioned chamber 116, in which is disposed a piston 118. The piston 118 is provided with a valve seat upon which may seat a valve 120. A spring 122 normally urges the piston 118 upwardly against the valve 120.

Secured to the valve 120 is a second or release valve 124. A spring 126 acting upon the valve 120 urges the release valve 124 to its seated position. When fluid under pressure is supplied to the chamber 116 above the piston 118, the piston is forced downwardly against resistance of the spring 122, to cause unseating of the valve 120. Fluid under pressure may then flow past the unseated valve 120 to the brake cylinders, by way of pipe 130.

When the pressure in the brake cylinders has reached a predetermined value, the spring 122 moves the piston 118 upwardly to cause seating of the valve 120. Any slight differences in pressure on either side of the piston 118 are equalized through the small ports 132 in the piston.

When the pressure above the piston 118 is suddenly reduced, as by unseating of the valve 110 in the connected release valve device 32, the pressure in the brake cylinders acts to move the piston 118 and valve 120 upwardly against resistance of the spring 128. This movement of the piston unseats the release valve 124 and fluid pressure in the brake cylinders is released to the atmosphere by way of release port 126.

The triple valve device 42 may be of any of the standard types commonly used wtih fluid pressure braking equipment, and I have as one example shown a quick action type. As shown, this type is embodied in a casing defining a chamber 134 having communication with the main reservoir 43, and a second chamber 136 having communication with the auxiliary reservoir 41.

Disposed in the chamber 134 is a piston 138 adapted to actuate a graduating valve 140 and a slide valve 142, for controlling the supply of fluid under pressure from the auxiliary reservoir 41 to the brake cylinders 38, in a manner which will be more fully hereinafter described.

The triple valve device is also provided with the usual emergency piston 144, which in cooperation with an emergency valve 146 and a check valve 148 functions to provide the quick action during an emergency application of the brakes, this being a well known feature of this valve device.

The brake valve device 40 is shown as a two position valve, but, of course, may be of any of the other usual types. This valve is normally maintained in the position shown in the drawing when the brakes are electro-pneumatically operated, and is moved toward the position shown in dotted lines for the handle when the brakes are being pneumatically controlled.

When positioned as shown in the drawings, the chamber 134 of the triple valve device is maintained in communication with the main reservoir 43, and as a consequence the piston 138 is held in release position.

The pneumatic relay 52 comprises a casing having a chamber in which is disposed a piston 150, normally urged to a biased position by a spring 152, to hold a movable contact 154 in engagement with stationary contact 156. The portion of the chamber beneath the piston 150 is connected to the release pipe 114, so that when pressure is built up in this pipe, as by supply of fluid under pressure to the brake cylinders from the triple valve device 42, the piston 150 will be moved upwardly to disconnect the movable contact 154 from the stationary contacts 156.

The magnet valve device 48 may be a duplicate of the release magnet valve devices 32, as shown, and further description of this valve device is therefore not necessary. Similarly, the application valve device 50 is shown as a duplicate of the application valve devices 34, and further description of this valve device becomes unnecessary.

The retardation controller device 54 is embodied in a casing having a pendulum 160 adapted to be swung about a pivot 162. The pendulum 160 is urged to a balanced position by spring-pressed plungers 164. The pendulum is normally held in a balanced position and is caused to move when acted upon by external forces due to a change in the speed of the vehicle.

Movement of the pendulum 160 to the right or left is opposed first by a light spring 166 and subsequently by a heavy spring 168. Initial movement of the pendulum compresses the light spring 166 until a shoulder or flange 170 on the plunger 164 engages an adjustable stop 172. Thereafter, further movement of the pendulum causes movement of an outer sleeve 174 against resistance of the heavy spring 168.

The tension of the light spring 166 may be regulated by a regulating screw 176. Tension of the heavy spring 168 may be regulated by an adjusting member or sleeve 178.

Carried by the pendulum 160 and adapted to engage stationary contacts 180 and 182 spaced therefrom, is a movable contact member 184. The contacts 180 on either side of the movable contacts 184 are connected together, as are the contacts 182, so that the retardation controller device will be effective for either direction of travel of the vehicle.

Since the opposition to movement of the pendulum 160 is less when opposed by the light spring 166 than when opposed by the heavy spring 168, it is obvious that a relatively small force of inertia will cause initial movement of the pendulum, while a larger force of inertia will be required to effect larger movements of the pendulum. Since the force of inertia acting to move the pendulum is proportional to the rate of speed change of the vehicle, it will be obvious that tension of the two springs may be adjusted so that a given relatively low rate of retardation will compress the light spring, to cause engagement between the movable contact 184 and a stationary contact 180, and so that a higher rate of retardation will be required to compress the heavy spring to cause engagement between the movable contact 184 and one of the stationary contacts 182. As will hereinafter more fully appear, the retardation controller device is employed to limit the rate of retardation produced by application of the brakes.

Each of the contact mechanisms 60, which may be associated with one or both of each pair of wheels, essentially comprises an insulating member 186 secured to the axle of the wheels and carrying a contact member 188, which is adapted to bridge a pair of stationary contacts 190 disposed adjacently thereto, when the axle is rotating.

The stationary contacts 190 are connected in the circuits leading to the relays 62. The relays 62 are so designed that when the axles are rotating above a certain predetermined or chosen speed, the frequency of contact between the member 188 and contacts 190 is such that the relays are insufficiently energized to open their contacts, but when the speed falls below this chosen value, the frequency of contact is such that the relays are energized and open their contacts. The purpose of this will hereinafter more fully appear.

The pneumatic relay 64 is provided with similar parts to pneumatic interlock relay 52, and is adapted to actuate a movable contact 192 into and out of engagement with stationary contacts 194, in a manner to be presently described.

The timing magnet valve device 66 is essentially a duplicate of the right hand application magnet valve device 30, and requires no further description.

The ball check valve 68 is provided with a choke passage 196, which is adapted to release fluid pressure slowly from the chamber of the pneumatic relay 64 to the atmosphere when the double beat valve of timing magnet valve device 66 has been actuated to its lower seated position. The object of this will appear from the following description of the operation of this embodiment.

In operation, when the vehicle is running, the drum of the controller 10 at the head end of the train is maintained in release position, while the drum of the controller at the rear end of the vehicle is maintained in the off position.

In release position the drum at the head end of the train supplies current to the interlock relay 46 from a battery 200, or other source of current supply, by way of the finger 70, and conductors 202 and 204. The relay is thus energized to close its contacts 206, which effects a supply of current to the magnet valve device 48, causing it to seat its valve 110.

When this valve is seated, the pressure above and below the valve 109 of the application valve device 50 is equalized and the valve 100 is therefore maintained in its seated position. The pressure of fluid supplied to the piston chamber 134 of the triple valve device 42 from the main reservoir 43 is thus maintained substantially constant and the slide valve of the triple valve device is held in release position. The pneumatic control equipment is therefore held in release position so long as the interlock relay 46 is maintained energized.

When it is desired to effect an application of the brakes, the drum 67 of the controller 10 is moved through the "service braking range" a degree in accordance with the desired degree of braking. Let it be assumed by way of illustration, that the drum is moved to the last or seventh position in the "service braking range." This movement of the drum will cause sequential engagement with fingers 71 to 77, inclusive, while maintaining engagement with the two fingers 69. The drum is disengaged from the finger 70 in the first application position and remains disengaged therefrom in all service positions.

When the drum engages finger 71 timing relay 12 is energized through a circuit including conductors 214, 216 and 204. Timing relay 12 is of the slow pick-up, slow-release type and an interval of time elapses before it operates its contacts.

In the meanwhile, the engagement of the drum with finger 71 has also formed circuits to and energized both the master release relay 28 and the master application relay 26. The circuit to the master release relay includes conductors 214, 216 and 218, back contacts 220 of timing relay 14, and conductors 222, 224 and 204. The circuit to the master application relay 26 includes conductors 214 and 216, contacts 246, and conductors 248, 250, 252, and 204. The master release relay immediately closes its contacts 226, thereby causing energization of the electro-magnets in both release magnet valve devices 32, to seat the valves 110 therein and cut off venting of the brake cylinders 38 to the atmosphere, and the master application relay closes its contacts 254 to energize the application magnet valve devices 30.

The circuit formed to energize the right hand release magnet valve device 32 from the battery 200 includes fingers 69 of the controller 10, conductors 208 and 210, contacts 226 of master release relay 28, conductor 228, contacts 154 and 156 of pneumatic relay device 52, fingers 80 of the controller 10 at the rear end of the vehicle, conductors 230 and 232, contacts 234 of relay 58, conductor 236, contacts 238 of relay 62, the right hand release magnet valve device, and conductors 240, 224 and 204.

The circuit to the left hand release magnet valve device is the same as that to the right hand magnet valve device, except that from contacts 234 of the relay 58 the circuit includes contacts 242 of relay 62 and conductor 244.

The seating of the valves 110 in the release magnet valve devices 32 is accomplished very rapidly. Simultaneously with the seating of these valves, both of the application magnet valve devices 30 operate to cause their double beat valves 84 to be actuated to lower seated position, whereupon fluid pressure in the chamber 89 of the application valve devices 34 is released to the atmosphere, the valves 100 unseating, and fluid under pressure is then supplied to the brake cylinders by way of the quick release valve devices, which operate in the manner heretofore described.

When the master application relay 26 closes its contacts 254, current is supplied to the left hand application magnet valve device 30 through a circuit including conductors 208 and 256, contacts 254 of the master application relay 26, conductors 258, contacts 260 of relay 56, conductors 262 and 264, the left hand application magnet valve device 30, and conductors 268, 240, 224 and 204.

The circuit to the right hand application magnet valve device is the same as that just described, except that from the conductor 262 the circuit includes the right hand application magnet valve device, and conductors 270, 224 and 204.

Energization of the left hand application magnet valve device causes movable contact 98 to engage stationary contacts 99, to energize wire checking relay 272, through a circuit including fingers 69 of the controller 10, conductors 208 and 210, contacts 226 of master release relay 28, conductor 228, contacts 154 and 156 of pneumatic relay 52, fingers 80 of the controller 10 at the rear of the vehicle, conductors 230, 232 and 273, contacts 98 and 99 of the application magnet valve device, conductor 274, checking relay 272 and conductors 276 and 204.

Energization of the checking relay 272 causes it to close its contacts 278 and 280. Closing of contacts 280 maintains energization of the interlock relay 46 by reconnecting the conductor 202 to the battery 200 through conductors 282, contacts 280, and conductors 284 and 208, and fingers 69. During the establishing of this holding circuit for relay 46, contacts 206 are held closed due to the slow release feature of the relay.

Closing of contacts 278 provides a holding circuit for the checking relay 272, by way of finger 71 of the controller 10, conductor 214, and the circuit previously described.

After a definite interval of time, timing relay 12 opens front contacts 246 and closes back contacts 286. Opening of front contacts 246 would cause deenergization of the master application relay 26 were it not maintained energized through a circuit including finger 72, conductor 290, back contacts 288 of timing relay 14, conductors 248 and 250, master application relay 26, and conductors 252 and 204.

Closing of back contacts 286 causes energization of timing relay 14 through a circuit including finger 72, conductor 290, back contacts 286 of timing relay 12, conductor 291, timing relay 14, and conductors 292 and 204. Timing relay 14 is, however, also of the slow pick-up, slow-release type and delays operation of its front and back contacts for a definite interval of time, as did the timing relay 12.

After this predetermined interval of time, timing relay 14 closes its front contacts 294 and 296, and opens back contacts 220 and 288, and actuates the movable element bridging back contacts 288 to contact with front contact 298.

Closing of front contacts 294 acts to insure that timing relay 12 is maintained energized.

Opening of back contacts 288 would deenergize master application relay 26 were it not maintained energized through a circuit including finger 73, conductors 297, back contacts 288 of timing relay 16, conductor 250, master application relay 26, and conductors 252 and 204.

Opening of front contacts 220 would cause deenergization of master release relay 28 were it not maintained energized when the movable element disengaging from back contacts 288 engages the front contact 298. The master release relay is thus maintained energized through a circuit including finger 72, conductor 290, front contact 298 of timing relay 14, back contacts 220 of timing relay 16, conductor 222, master release relay 28, and conductors 224 and 204.

Closing of front contacts 296 and causes energization of timing relay 16 through a circuit including finger 73, conductor 297, front contact 296 of timing relay 14, conductor 299, timing relay 16 and conductor 204.

Timing relays 16, 18, 20, 22 and 24 are duplicates of timing relay 14, and operate in the same manner. Therefore, with the drum in No. 7 service position, these relays close successively with a time delay interval therebetween, until relay 24 has finally operated its contacts.

When timing relay 24 has closed its front contacts and opened its back contacts, the master application relay 26 will have been deenergized and the master release relay 28 will be maintained energized, so that the supply of fluid under pressure to the brake cylinders will be lapped at a pressure corresponding to the seventh service position of the drum 67.

The master release relay 28 is of the slow-release type, so that during the interval of time while the control is being transferred from one timing relay to the next succeeding relay, opening of the circuit to this relay does not immediately cause opening of its contacts 226.

When timing relay 24 operates its contacts it either energizes or deenergizes a resistance unit 25, which is provided to cause the time delay of this relay to be the same as the others.

It will thus be seen that with the drum 67 moved to the seventh, or to any other, service position the timing relays close successively, each delaying operation of its contacts for a definite interval of time. This interval of time can, of course, be made to suit the desired operation of the equipment, but in the practice of my invention I prefer to make these intervals extremely short, so that when the drum is in its last service position a desired brake cylinder pressure may be built up in a very short time. As one example, I have found that a brake cylinder pressure of approximately sixty pounds per square inch can be attained in considerably less than one second through operation of the timing relays as described.

If the drum 67 is moved to any other position than that assumed, the supply of fluid under pressure to the brake cylinder will be lapped by the relay connected to the finger last contacting with the drum. For example, if the drum is moved to its fourth service position, the supply of fluid under pressure to the brake cylinders will be lapped when timing relay 18 will have operated its contacts. It will thus be seen that the supply of fluid under pressure to the brake cylinder may be caused to be lapped at any service position of the drum.

Assuming that the vehicle is traveling to the left, then as the pressure builds up in the brake cylinders and the vehicle begins to decelerate, the force of inertia due to this change in rate of speed will cause the pendulum 160 of the retardation controller device 54 to move to the left. As before stated, the purpose of the retardation controller device is to limit the rate of retardation which may be obtained by application of the brakes.

When the pendulum 160 swings to the left it causes compression of the light spring 166. When this spring has been compressed sufficiently, movable contact 184 carried by the pendulum will engage the left stationary contact 180. A circuit is then formed to the right hand relay 62 from the battery 200 through finger 69 of the controller 10, conductors 208, 210, and 212, contacts 184 and 180 of the retardation controller device, conductors 300 and 301, contacts 190 of the right hand switch mechanism 60, conductor 302, relay 62, and from thence back to the battery by way of conductors 270, 224, and 204.

In a similar manner a circuit is also formed to the left hand relay 62, from the battery 200, through the contacts 184 and 180 of the retardation controller device, and conductors 300 and 304, contacts 190 of the left hand switch mechanism 60, conductor 306, relay 62, and from thence back to the battery through conductors 308 and 224 and 204.

If the speed of rotation of the wheels with which the switch mechanisms are associated is such that the frequency of engagement between the stationary element 188 and the contacts 190 is above that which will permit energization of relays 62, then the relays will not open their contacts 238 and 242. If, however, the frequency of contact is below this predetermined value, then relays 62 will open their contacts and cause deenergization of the electro-magnets in the release magnet valve devices 32, to effect a steady release of fluid under pressure from the brake cylinders to the atmosphere.

Assuming that the speed of the vehicle is such that the relays 62 will not be energized by engagement of the movable contact 188 with the stationary contacts 190, and that the rate of retardation is such as to cause the pendulum 160 to swing further to the left to compress the heavy spring 168, then movable contact 184 will engage the stationary contact 182.

Relay 56 will then be energized from the battery 200 through a circuit including the movable contact 184, which as before described is connected to one side of the battery, stationary contact 182, conductor 310, relay 56, and from thence back to the battery by way of conductors 308, 224 and 204. Energization of relay 56 will close its contacts 312 and open its contacts 260. Closing of contacts 312 provides a holding circuit for the relay through a holding coil.

Opening of contacts 260 interrupts the circuit to the application magnet valve devices 30, which, if not previously interrupted by the deenergization of the master application relay 26, causes the magnet valve devices to cut off the supply of fluid under pressure to the brake cylinders.

When the release magnet valve devices 32 were initially energized upon application of the brakes, the timing magnet valve device 66 was energized at the same time to actuate its double beat valve 84 to lower seated position. In this position fluid pressure in the chamber of the pneumatic relay 64, beneath the piston 150, is released to the atmosphere slowly through the choke 196 of the ball check valve device 68. Therefore, when movable contact 184 of the retardation controller device engages stationary contact 182, relay 58 is energized through contacts 192 and 194 of the pneumatic relay 64, which contacts have by this time moved into engagement.

Energization of relay 58 opens its contacts 234, whereupon the electro-magnets in the release magnet valve devices 32 are deenergized, thereby effecting operation of the quick release valve devices 36, to release fluid pressure from the brake cylinders 38 to the atmosphere.

However, when the contacts 234 open they also open the circuit to the electro-magnet of the timing magnet valve device 66, which then permits its double beat valve 84 to be moved to its upper seated position. Fluid under pressure is thus again supplied to the pneumatic relay 64 to cause its contact 192 to disengage from stationary contacts 194. This in turn deenergizes the relay 58 to cause its contacts 234 to close.

It will thus be obvious that electrical relay 58 and pneumatic relay 64 will intermittently cause operation of each other, to intermittently effect a release of fluid under pressure from the brake cylinders until the rate of retardation has been reduced sufficiently to cause disengagement of movable contact 184 from stationary contact 182 of the retardation controller device, a time delay in the operation of the relays being provided by the slow escape of fluid pressure through the choke 196 in the ball check valve device 68.

When the rate of retardation has dropped sufficiently to cause movement of the pendulum 160 in the retardation controller device to the right, the relay 56 will be held energized unless the movable contact 184 has disengaged from the stationary contact 180, as the holding contacts 312 have effected a holding circuit through this stationary contact.

So long as the movable contact 184 remains in engagement with stationary contact 180, the relay 56 will continue to be energized to prevent further supply of fluid under pressure to the brake cylinders. If, as the vehicle decelerates, the rate of retardation should increase due to the increase of coefficient of friction between the rubbing parts of the brakes, then the pendulum 160 will again swing to the left and cause engagement of contact 184 with contact 182. Further fluid pressure will then be released from the brake cylinders in the manner just described.

When the vehicle has decelerated below a certain predetermined speed, the frequency of engagement between the movable contact member 188 and the stationary contacts 190 will be such that the relays 62 will become sufficiently energized to open their contacts. It is to be noted, however, that these relays can be energized only through the stationary contact 180 of the retardation controller device.

Since the relays 62 interrupt the circuits to the release magnet valve devices 32, it will be seen that for speeds below the aforementioned predetermined value, the retardation controller device establishes a new upper limit for the rate of retardation, which is governed by contact between movable contact 184 and stationary contact 180, whereas for the upper speed the upper limit of rate of retardation is governed by contact between movable contact 184 and stationary contact 182.

It will be noted, however, that if at some speed above this predetermined speed, any one or both of a pair of wheels should commence to decrease in speed below that corresponding to the speed of the vehicle, then the frequency of contact between the contacts 188 and 190 may be such that the relay 62 associated therewith will be energized. This will then deenergize the release magnet valve device operating the brakes applied to these wheels. It is to be understood that the wheel, or wheels, do not actually cease rotating, but while the speed is diminishing below that corresponding to the vehicle speed, pressure is being released from the brake cylinder, by operation of the quick release valve device 36, at a rate sufficient to check wheel sliding in the incipient stage. Before the wheel, or wheels, reach a "locked-wheel" stage then, the brakes will be released on the slipping wheel, or wheels, sufficiently to again permit the wheels to roll at a speed corresponding to the speed of the vehicle. As soon as the wheels commence to rotate at normal speed again, the relay 62 will be deenergized and further release thus prevented.

If at any time it is desired to effect a full release of brakes, the drum 67 is moved to release position. In this position all release magnet valve devices 32 will be deenergized and fluid pressure in the brake cylinder will be quickly released to the atmosphere by operation of the quick release valve devices 36.

If, however, it is desired to effect a graduated release, in the same manner that a graduated application was made, the drum 67 may be moved to the first application position. If, for example, the drum was in position seven and it were moved to position one, the timing relays 24, 22, 18, 16 and 14 would open their contacts successively, in the order named, with a time delayed interval for each due to the slow-release characteristic of the relays. Fluid pressure in the brake cylinders will then be released in graduated fashion until a value has been reached corresponding to that for the lap condition provided for by the energized position of timing relay 12.

In other words, as each relay is deenergized it effects a release of fluid pressure from the brake cylinder according to the time delay in opening its contacts. It is therefore possible to control either the build up or release of fluid pressure in the brake cylinders by simple manipulation of the control element governing movement of the drum 67, the timing relays responding to movement of this drum, operating successively to build up or decrease the pressure in the brake cylinder, according to which way the drum is moved.

When it is desired to effect an emergency application of the brakes, the drum 67 is moved to emergency position, whereupon the drum will engage fingers 78 and 79. By tracing the circuits from these two fingers it will be seen that the release magnet valve devices and application magnet valve devices are energized directly through the drum, instead of through the master relays, so that venting of the brake cylinders is immediately cut off and fluid under pressure is immediately supplied to the brake cylinders.

To summarize the operation thus far described, the operator moves the drum 67 to a position in accordance with a desired brake cylinder pressure. This movement of the drum causes operation of the timing relays to maintain a supply of fluid under pressure to the brake cylinders for a time as determined by the time delay provided for in the relays. The supply of fluid under pressure to the brake cylinders will be lapped when the last relay connected by the drum operates its contacts. This action is accomplished by operation of the supply and release magnet valve devices through the master relays 26 and 28, and results in a pressure being established in the brake cylinders corresponding to the degree or extent of movement of the drum 67 because the rate of supply is fixed.

If the rate of retardation produced by the build up of pressure in the brake cylinder is greater than that for which the retardation controller device has been set as an upper limit, the retardation controller device will operate to cut off the supply of fluid to the brakes, and if necessary will release pressure from the brake cylinders until the rate of retardation has diminished to that provided for. This maximum rate, or upper limit, is determined by the speed of the vehicle. If the speed is above a predetermined value a higher rate is permissible, but if the speed is below this predetermined value, then the switch mechanism 60 functions, in cooperation with the retardation controller device, to make effective the lower rate as provided for in the retardation controller device.

A release of fluid pressure from the brake cylinders through operation of the drum 67 may be made in steps by moving the drum slowly through the "service braking range," or with delayed action, so as to cause the timing relays to open with delayed time intervals to released fluid pressure from the brake cylinders in a desired manner, or the drum may be moved quickly to "release" position to effect a quick release of the brakes.

Emergency application of the brakes is accomplished by by-passing the timing relays and causing operation of the magnet valve devices direct from the drum 67.

When anyone or pair of wheels begin to slide the brakes on that pair of wheels are immediately released before the wheels stop rolling, independently of the brakes on the other wheels of the vehicle, and are held released until the wheel, or wheels, commence to roll again at normal speed, after which the brakes are again held applied.

If when attempting to make an application of the brakes by movement of the drum 67, the left hand application magnet valve device 30 should fail to be energized, as by failure of the source of current supply, or by broken conductors, then movable contact 98 would not engage the stationary contacts 99 and the checking relay 272 would not be energized.

In this case the interlock relay 46 would open its contacts 206, thereby deenergizing the magnet valve device 48. Deenergization of this valve device permits its valve 110 to be unseated to release fluid pressure from the chamber 89 above the valve 100 in the application valve device 50, and the valve 100 would be unseated to release fluid pressure from the normally changed or brake pipe 141 leading to the chamber 134 to the left of the piston 138, in the triple valve device 42.

Diminishing of the pressure to the left of the piston 138 causes it to move to the left to emergency position and carry with it the graduating valve 140 and slide valve 142 which, as may be seen from the drawings, cuts off communication between the pipe 114 and the atmosphere, and connects this pipe with fluid pressure from the auxiliary reservoir 41.

Fluid under pressure then flows from the auxiliary reservoir 41 to the brake cylinders, through chamber 136, a large port in the slide valve 142, passage 115, and pipe 114. At the same time the slide valve uncovers the passage 145 to permit fluid under pressure to flow to the face of the emergency piston 144 to cause unseating of the emergency valve 146, to permit fluid under pressure below this valve to flow to the brake cylinders. Pressure beneath the check valve 148 will then unseat the check valve to permit fluid under pressure to flow from the brake pipe to the brake cylinders until a predetermined brake cylinder pressure has been reached, whereupon the check valve again seats.

It will be seen then that upon failure of the electro-pneumatic control equipment to respond to operation of the drum 67, the pneumatic control equipment will operate to effect an emergency application of the brakes.

A service or an emergency application of the brakes by operation of the pneumatic equipment may be effected in a manner similar to that just described, by movement of the handle of the brake valve device 40 toward the position indicated in dotted lines. With this movement fluid pressure in the brake pipe 141 and chamber 134 of the triple valve device is released to the atmosphere through a port in the brake valve device at either a service or an emergency rate, to effect either the operation of the triple slide valve as just described, or to cause it to be moved to service position.

The pneumatic control equipment is intended to operate only in case of emergency, or when it is desired to operate the vehicle while out of regular service, as for example, when switching about the yards of a terminal, or when bringing the vehicle into a service shop after disablement of its electro-pneumatic control equipment.

Under these conditions the high brake cylinder pressure effected by operation of the electro-pneumatic control equipment is not necessary, and to limit the brake cylinder pressure to a value below these high values, the brake cylinder volume reservoir 44 has been provided. This reservoir, which is connected to the pipe 114, adds additional volume to the brake cylinders when fluid is supplied thereto through the triple valve device.

When fluid is supplied to the brake cylinders through the triple valve device 52, it flows to the pneumatic relay 52, causing its piston 150 to be moved upwardly and thereby disengage movable contact 154 from stationary contacts 156. This opens the release magnet valve circuit in the electro-pneumatic control equipment, so that if either drum of the controllers 10 is accidentally left in application position, the electro-pneumatic equipment cannot prevent application of the brakes when operation is controlled by the pneumatic control equipment.

The choke plug 47 prevents undue loss of pressure from the main reservoir when fluid is released to the atmosphere from the pipe leading to the chamber 134 in the triple valve device by operation of application valve device 50.

It is to be understood that I propose to provide a switch mechanism associated with each pair of wheels on the vehicle, where both wheels are rigidly secured to the axle, and in cases where the wheels are not secured rigidly to the axle, then a switch mechanism is provided for each wheel. A relay 62 will then be provided for each switch mechanism 60, so that whenever any individual wheel commences to slide, fluid pressure is automatically released from the brake cylinders controlling the brakes on that wheel until the wheel commences rotating again.

When adapting the embodiment shown to a railway train comprising multiple units, it is desirable that duplicate sets of the timing relays be provided at both the head and rear ends of the train. This will then minimize the number of conductors running the length of the train.

It will also be apparent to those skilled in the art to which this invention applies, that duplication of other parts may be made throughout the train to conform to established practices, and I do not, therefore, wish to be limited to the exact arrangement of parts shown and described in the foregoing, or otherwise than by the spirit and scope of the appended claims.

Having now described my invention, what I claim as new and desire to secure by Letters Patent, is:

1. In a vehicle brake apparatus, the combination with a brake cylinder, of a controller device having a plurality of braking positions, a plurality of timing relays, each of said relays corresponding to one of said braking positions, means controlled by said relays for controlling the supply of fluid under pressure to said brake cylinder, and means whereby operation of said controller device causes sequential operation of a number said relays corresponding to the position to which said controller device is operated to effect a supply of fluid under pressure to said brake cylinder, the last of said relays to operate effecting a lapping of said supply.

2. In a vehicle brake apparatus, the combination with a plurality of brake cylinders, of electro-pneumatic self-lapping apparatus for effecting a supply of fluid under pressure to said brake cylinders in accordance with a desired degree of braking, and means including electric and pneumatic relays for intermittently effecting a release of fluid pressure from the brake cylinders at a chosen rate of retardation of the vehicle.

3. In a vehicle brake apparatus, the combination with a plurality of brake cylinders, of electro-pneumatic self-lapping apparatus for effecting a supply of fluid under pressure to said brake cylinders in accordance with a desired degree of braking, means for releasing the brakes on sliding wheels, and means for rendering said last means ineffective below a chosen rate of retardation.

4. In a vehicle brake apparatus, the combination with a plurality of brake cylinders, of electro-pneumatic self-lapping apparatus for effecting a supply of fluid under pressure to said brake cylinders in accordance with a desired degree of braking, pneumatic apparatus for also effecting a supply of fluid under pressure to said brake cylinders, and electro-responsive means for rendering said pneumatic apparatus ineffective when said electro-pneumatic apparatus is effective.

5. In a vehicle brake apparatus, the combination with a brake cylinder, of a control device operable through different degrees of movement for controlling applications of the brakes, means responsive to operation of said control device for effecting a supply of fluid under pressure to said brake cylinder, and timing means for effecting a lapping of said supply after an interval of time which varies directly according to the degree of movement of said control device.

6. In a vehicle brake system, the combination with a brake cylinder, of a normally deenergized relay, means responsive to energization of said relay for effecting a supply of fluid under pressure to said brake cylinder, a control device operable through different degrees of movement, for controlling applications of the brakes, means responsive to initial movement of said device for energizing said relay, and timing means for effecting deenergization of said relay after a time interval corresponding to the degree of movement of said device.

7. In a vehicle brake system, the combination with a brake cylinder, of a controller device operable through different degrees of movement for controlling applications of the brakes, means responsive to initial movement of said controller device for effecting a supply of fluid under pressure to said brake cylinder, a plurality of slow acting relays, means responsive to operation of said controller device for causing sequential operation of a number of said relays corresponding to the degree of movement of said controller device, and means responsive to operation of the last of said relays so operated for cutting off said supply to said brake cylinder.

8. In a vehicle brake system, the combination with a brake cylinder, of a relay, means responsive to energization of said relay for effecting a supply of fluid under pressure to said brake cylinder and operable when said relay is deenergized to cut off said supply, a source of current supply, a plurality of circuits through which current is adapted to be supplied to energize said relay, a controller device for connecting said circuits to said source of current supply, a plurality of timing relays for controlling said circuits, and means whereby operation of said controller device effects sequential operation of said timing relays to effect sequential opening of said circuits.

9. In a vehicle brake system, the combination with a brake cylinder, of a master application relay, a master release relay, means responsive to energization of said master application relay for effecting a supply of fluid under pressure to said brake cylinder, means responsive to deenergization of said master release relay for effecting a release of fluid under pressure from said brake cylinder, a controller device movable to different positions, means responsive to initial movement of said controller device for effecting energization of both of said master relays, and timing means for subsequently effecting deenergization of said master application relay after a time corresponding to the position of said controller device.

10. In a vehicle brake system, in combination, a brake cylinder, electro-pneumatic means for effecting a supply of fluid under pressure to said brake cylinder, pneumatic means for also effecting a supply of fluid under pressure to said brake cylinder, a normally energized relay, means rendered operable when said relay is energized for preventing operation of said pneumatic means, means for deenergizing said relay when said electro-pneumatic means is initially operated to effect a supply of fluid under pressure to said brake cylinder, and means for reenergizing said relay when said electro-pneumatic means is effective in effecting a supply of fluid under pressure to said brake cylinder.

11. In a vehicle brake system, in combination, a brake cylinder, electroresponsive valve means operable when energized to effect a supply of fluid under pressure to said brake cylinder, an automatic valve device operated upon a decrease in pressure for also effecting a supply of fluid under pressure to said brake cylinder, a normally energized relay, means rendered operable when said relay is deenergized for effecting a decrease in pressure to cause operation of said automatic valve device, a controller device, means responsive to operation of said controller device for effecting energization of said electroresponsive valve means and for effecting deenergization of said relay, and means responsive to operation of said electroresponsive valve means for reenergizing said relay.

12. In a vehicle brake system, in combination, a brake cylinder, a magnet valve device operable when energized to effect a supply of fluid under pressure to said brake cylinder, an automatic valve device having a release position and an application position and operable when in application position to effect a supply of fluid under pressure to said brake cylinder, an interlock relay, a source of current supply, a normally closed circuit connecting said interlock relay to said source to maintain said relay energized, means responsive to energization of said relay for maintaining said automatic valve device in release position, a controller device, means responsive to operation of said controller device for effecting energization of said magnet valve device and for opening said normally closed circuit, a second normally open circuit, means responsive to closing of said second circuit for reconnecting said interlock relay to said source, and contacts operated when said magnet valve device is energized for closing said second circuit.

13. In a vehicle brake apparatus, in combination, a brake cylinder, a control device movable to different positions, means responsive to initial movement of said control device for effecting a supply of fluid under pressure to said brake cylinder, timing means for effecting a lap of said supply after a time interval which varies directly according to the position of said controller device, and means operated according to the rate of retardation of the vehicle due to application of the brakes for effecting a release of fluid under pressure from said brake cylinder.

14. In a vehicle brake apparatus, in combination, a brake cylinder, electroresponsive application means operable when energized to effect a supply of fluid under pressure to said brake cylinder, electroresponsive release means operable when deenergized to effect a release of fluid under pressure from said brake cylinder, a controller device, means responsive to operation of said controller device for effecting energization of said electroresponsive release means and said electroresponsive application means, means also responsive to operation of said controller device for effecting deenergization of said electroresponsive application means after a predetermined interval of time, and means rendered operable at a chosen rate of retardation for effecting deenergization of said electroresponsive release means.

15. In a vehicle brake apparatus, in combination, a brake cylinder, an application magnet valve device operable when energized to effect a supply of fluid under pressure to said brake cylinder, a release magnet valve device operable when deenergized to effect a release of fluid under pressure from said brake cylinder, a circuit through which current is adapted to be supplied to energize said application magnet valve device, a second circuit through which current is adapted to be supplied to energize said release magnet valve device, a controller device, means responsive to operation of said controller device for effecting closing of both of said circuits, timing means operable to effect opening of said first circuit after a predetermined interval of time, a retardation controller device having two normally open contacts and operable according to the rate of retardation to sequentially close said contacts, means responsive to closure of one of said contacts for also effecting opening of said first circuit, and means responsive to closure of the other of said contacts for effecting opening of said second circuit.

16. In a vehicle brake apparatus, in combination, a brake cylinder, electro-pneumatic means for effecting a supply of fluid under pressure to said brake cylinder, retardation control means for controlling the supply of fluid under pressure to said brake cylinder to maintain a substantially fixed rate of retardation, and means operated according to the speed of the vehicle for rendering said retardation control means effective in maintaining a higher rate of retardation at high speeds than at low speeds.

17. In a vehicle brake system, the combination with a brake cylinder, of means for effecting a supply of fluid under pressure to said brake cylinder, means for controlling brake cylinder pressure to maintain one or more constant rates of retardation due to application of the brakes, and means for causing said last means to maintain one rate of retardation above a predetermined speed and a lower rate of retardation below said predetermined speed.

18. In a vehicle brake system, in combination, a brake cylinder, means for effecting a supply of fluid under pressure to said brake cylinder, a retardation controller device having two normally open contacts, means responsive to closing of either of said contacts for effecting a release of fluid under pressure from said brake cylinder, and means governed by the speed of the vehicle for preventing release of fluid under pressure from said brake cylinder upon closure of one of said contacts when the vehicle is traveling above a predetermined speed.

19. In a vehicle brake system, in combination, a brake cylinder, electro-pneumatic self-lapping apparatus for effecting a supply of fluid under pressure to said brake cylinder, a retardation controller device operated according to the rate of retardation produced by an application of the brakes, means responsive to operation of said retardation controller device at one rate of retardation for effecting a steady release of fluid under pressure from said brake cylinder, means operated according to the speed of the vehicle for preventing said release above a predetermined speed, and means responsive to operation of said retardation controller device at another rate of retardation for effecting an intermittent release of fluid under pressure from said brake cylinder at any speed.

20. In a vehicle brake apparatus, the combination with a brake cylinder, of means for effecting a supply of fluid under pressure to said brake cylinder, a normally deenergized relay, means responsive to energization of said relay for effecting a release of fluid under pressure from said brake cylinder, a circuit through which current is adapted to be supplied to energize said relay, normally open contacts in said circuit, means for closing said contacts at a chosen rate of retardation of the vehicle, and speed controlled switch means operable when said contacts are closed to effect energization of said relay below a predetermined speed and operable to prevent energization of said relay above said predetermined speed.

21. In a vehicle brake system, in combination, a brake cylinder, means for effecting a supply of fluid under pressure to said brake cylinder, a vehicle wheel, means responsive to a decrease in the speed of said wheel below a definite value for effecting a release of fluid under pressure from said brake cylinder, and a retardation controller device operated according to the rate of retardation for jointly controlling the release from said brake cylinder.

22. In a train brake system, the combination with a plurality of brake cylinders, each of said brake cylinders being operable to apply the brakes on one or more vehicle wheels, of means for effecting a supply of fluid under pressure to said brake cylinders, means for releasing fluid under pressure from brake cylinders associated with wheels which decrease in speed below a chosen value, means for rendering said last means ineffective below a chosen rate of retardation, and means operable to effect a release of fluid under pressure from all of said brake cylinders at a higher rate of retardation.

23. In a train brake system, in combination, a plurality of brake cylinders, means for effecting a supply of fluid under pressure to said brake cylinders, a retardation controller device having two normally open contacts, the first of said contacts being closed at one rate of retardation and the second of said contacts being closed at a higher rate of retardation, means rendered operable upon the closing of said first contact for effecting a release of fluid under pressure from the brake cylinders associated with wheels which commence to slide, and means rendered operable upon the closing of said second contact for effecting an intermittent release of fluid under pressure from all of said brake cylinders until said second contact has been opened.

24. In a vehicle brake apparatus, the combination with a brake cylinder, of means for effecting a supply of fluid under pressure to said brake cylinder, a normally deenergized electric relay, means responsive to energization of said electric relay for effecting a release of fluid under pressure from said brake cylinder, means for effecting energization of said electric relay, a pneumatic relay adapted when operated to effect deenergization of said relay, and means also responsive to energization of said electric relay for effecting operation of said pneumatic relay, whereby said electric relay and said pneumatic relay cause intermittent operation of each other to effect an intermittent release of fluid under pressure from said brake cylinder.

25. In a vehicle brake system, in combination, a brake cylinder, means for electro-pneumatically effecting a supply of fluid under pressure to said brake cylinder, a volume reservoir, pneumatic means for effecting a supply of fluid under pressure to said brake cylinder and to said volume reservoir, and means for rendering said pneumatic means ineffective when said electro-pneumatic means is effective.

26. In a vehicle brake system, in combination, a brake cylinder, electroresponsive valve means operable when energized to effect a supply of fluid under pressure to said brake cylinder, a controller device having a plurality of service braking positions and an emergency braking position, timing means responsive to operation of said controller device to a service braking position for effecting energization of said electroresponsive valve means for a period of time corresponding to said service braking position, and means responsive to operation of said controller device to emergency position for effecting energization of said electroresponsive valve means independently of operation of said timing means.

27. In a vehicle brake system, in combination, a brake cylinder, a controller device having a release position and adapted to be operated through different degrees of movement to different application positions, means responsive to initial movement of said controller device toward application position for effecting a supply of fluid under pressure to said brake cylinder, means operable to lap said supply after a time interval corresponding to the degree of movement of said controller device to application position, and means responsive to movement of said controller device toward release position for effecting a release of fluid under pressure from said brake cylinder corresponding to the degree of movement of said controller device toward release position.

28. In a vehicle brake system, in combination, brake means for braking the vehicle, means for effecting an application of said brake means, means for releasing the brake means on sliding wheels, and means for preventing operation of said releasing means below a chosen rate of retardation.

29. In a vehicle brake apparatus, the combination with a brake cylinder, a supply magnet valve device and a release magnet valve device, of a retardation controller device, means operated by said retardation controller device for controlling operation of said valve devices, and means responsive to wheel skidding and rendered operative by operation of said retardation controller device for effecting operation of said release magnet valve device.

30. In a vehicle brake system, in combination, a brake cylinder, means for effecting a supply of fluid under pressure to said brake cylinder, a release magnet valve device operable when deenergized to release fluid under pressure from said brake cylinder, means for maintaining said magnet valve device energized when fluid under pressure is supplied to said brake cylinder, a normally deenergized relay operable when energized to deenergize said magnet valve device, and a switch device carried by a wheel of the vehicle and operable when the speed of the wheel falls below a predetermined value to effect energization of said relay.

31. In a vehicle brake system, in combination, brake means, means for effecting an application of said brake means to produce a braking effect on the vehicle, means operated according to the rate of retardation of the vehicle, means responsive to operation of said last means at a chosen rate of retardation for decreasing the braking effect produced by said brake means, and means governed by the speed of the vehicle for determining at what rate of retardation said last means responds.

32. In a vehicle brake system, in combination, brake means, means for effecting an application of said brake means to produce a braking effect on the vehicle, a retardation controller device operated according to the rate of retardation of the vehicle, means responsive to operation of said retardation controller device for controlling the degree of application of said brake means, and speed controlled means for controlling said last means.

33. The method of controlling vehicle brakes which comprises regulating the intensity of brake application in response to the deceleration of the vehicle produced by such brake application, and thus establishing a rate of deceleration; and changing such rate in response to change of speed.

34. The method of controlling vehicle brakes which comprises regulating the intensity of brake application in response to the deceleration of the vehicle produced by such brake application, and thus establishing a rate of deceleration; and changing such rate in response to change of speed past a chosen critical value.

35. The method of controlling vehicle brakes which comprises regulating the intensity of brake application in response to the deceleration of the vehicle produced by such brake application, and thus establishing a rate of deceleration; and reducing such rate in response to reduction of vehicle speed.

36. The method of controlling vehicle brakes which comprises regulating the intensity of brake application in response to the deceleration of the vehicle produced by such brake application, and thus establishing a rate of deceleration; and reducing such rate in response to reduction of speed below a critical value.

37. The combination of regulable braking means for a vehicle and controlling means therefor comprising an inertia device responsive to vehicle deceleration, and a speed responsive device responsive to vehicle speed connected to regulate conjointly said braking means.

38. The combination of a wheeled vehicle; regulable braking means for a wheel thereof; and controlling means for said braking means comprising an inertia device responsive to vehicle deceleration and a device responsive to the speed of such braked wheel connected conjointly to regulate said braking means.

39. In a vehicle brake system, in combination, a brake cylinder, magnet valve means for effecting a supply of fluid under pressure to said brake cylinder, pneumatic means for also effecting a supply of fluid under pressure to said brake cylinder, and means effective following and in response to an operation of said magnet valve means which functions to effect the supply to the brake cylinder for inhibiting an application operation of said pneumatic means, but effective to permit an application operation of said pneumatic means to effect the supply of fluid under pressure to said brake cylinder should said magnet valve means not be operated to do so.

40. In a vehicle brake apparatus, the combination with a plurality of brake cylinders, of electropneumatic self-lapping apparatus for effecting a supply of fluid under pressure to said brake cylinders in accordance with a desired degree of braking, pneumatic apparatus for also effecting a supply of fluid under pressure to said brake cylinders, and means effective upon operation of said electropneumatic apparatus for inhibiting effective operation of said pneumatic apparatus.

41. In a brake equipment for vehicles, in combination, a brake cylinder, control means for controlling the gradual application and release of fluid under pressure to and from said brake cylinder, a brake handle for controlling the operation of said control means, and timing means responsive to the amount of movement of said handle for determining the duration of increasing application of said brake.

42. In a brake equipment for vehicles, in combination, a brake cylinder, electrically operated valves for controlling the application and release of fluid under pressure to and from said brake cylinder, a brake handle for controlling the operation of said valves, and timing means responsive to the amount of movement of the handle in the one or in the other direction, respectively, for determining the duration of application operation, and of release operation, of said valves.

43. In a brake equipment for vehicles, in combination, a brake cylinder, electrically operated valves for controlling the application and release of fluid under pressure to and from said brake cylinder, a brake handle for controlling the operation of said valves, means actuated upon movement of said handle to a service position for effecting an application operation of said valves, means responsive to the amount of movement of said handle in a direction of greater braking service application for determining the duration of application operation of said valves, and means responsive to the amount of movement of said handle in a direction of lesser brake service application for determining the duration of release operation of said valves.

44. In a fluid pressure brake, the combination with a brake cylinder, of valve means operative to open communication through which fluid under pressure is supplied to the brake cylinder, manually controlled means for effecting the operation of said valve means to open said communication, and time responsive means operative automatically after a time interval for effecting the operation of said valve means to close said communication.

45. In a fluid pressure brake, the combination with a brake cylinder, of valve means operative to open communication through which fluid under pressure is supplied to the brake cylinder, means including a manually operable member operable to effect the operation of said valve means to open said communication, and time responsive means operative automatically after a time interval which varies according to the extent of movement of said manually operable member to effect the operation of said valve means to close said communication.

46. In a fluid pressure brake, the combination with a brake cylinder, of valve means operative to open communication through which fluid under pressure is supplied to the brake cylinder, valve means operative to open communication through which fluid under pressure is released from the brake cylinder, means including a manually operable member operable upon movement in one direction to effect the operation of said first named valve means to open said communication to supply fluid under pressure to the brake cylinder and upon movement in the other direction to effect the operation of said second named valve means to open said communication to release fluid under pressure from the brake cylinder, and time responsive means operative automatically after a time interval which varies according to the extent of movement of said manually operable member in either direction within an application zone to effect the operation of the valve means to close said communication.

47. In a vehicle or train brake system, in combination, means for effecting an application of the brakes, speed controlled means, means operated according to the rate of retardation of the vehicle or train, and means for controlling the degree of application of the brakes partly in response to operation of said speed controlled means and partly in response to operation of said retardation controlled means.

48. In a brake system for a wheeled vehicle, in combination, means for effecting application of the brakes on the several wheels of the vehicle, wheel slip detecting means controlled by the speed of a vehicle wheel, means operated according to the rate of retardation of the vehicle, and means for controlling the degree of application of the brakes on at least the said one wheel partly in response to operation of said wheel slip detecting means and partly in response to operation of said retardation controlled means.

49. In a vehicle brake system, in combination, a brake cylinder, means for effecting a supply of fluid under pressure to said brake cylinder, means controlled by the speed of a vehicle wheel, means operated according to the rate of retardation of the vehicle, and means for controlling brake cylinder pressure partly in response to operation of said speed controlled means and partly in response to operation of said retardation controlled means.

50. In a vehicle brake system, in combination, fluid pressure brake operating means, a brake pipe, means governed by the fluid pressure in said brake pipe for controlling said fluid pressure brake operating means, electroresponsive means for also controlling the operation of said fluid pressure brake operating means, a manually operated device for controlling the operation of said electroresponsive means to effect an application of the brakes to a degree dependent upon the position of said device in an application zone, and means rendered operable when said device is in said application zone and upon failure of said electroresponsive means to produce a brake application, for effecting a reduction in brake pipe pressure to cause operation of said fluid pressure brake operating means to effect an emergency application of the brakes.

51. In a brake equipment for vehicles, in combination, a fluid pressure operated brake, a brake pipe, fluid pressure responsive means responsive to the fluid pressure in said brake pipe for controlling the application of the brake, electroresponsive means for controlling the application of the brake, means including a manually operable device for controlling the operation of said electroresponsive means to effect an application of the brake in accordance with the position of said manually operable device in an application zone, a checking relay adapted to be operated upon operation of said electroresponsive means, and means responsive to a failure in the operation of said checking relay for effecting a reduction in brake pipe pressure to cause operation of the fluid pressure responsive means to effect an emergency application of the brakes.

52. In a vehicle brake system, in combination, means including electroresponsive mechanism for controlling the degree of the braking force, a first relay device controlled according to the speed of a vehicle wheel, a second relay device controlled according to the rate of retardation of the vehicle, and means for causing said two relay devices to jointly control said electroresponsive means.

53. In a brake system for a wheeled vehicle, in combination, means for effecting an application of the vehicle brakes on all of the vehicle wheels, means responsive to a decrease in the speed of one of said wheels below that of the speed of the other wheels for effecting a release of the brakes on that wheel, and a retardation controller device operated according to the rate of retardation of the vehicle for coacting with said last means to control the release of the brakes.

54. In a vehicle brake system, in combination, brake means for braking the vehicle, means for effecting an application of said brake means, means for releasing the brake means on wheel or wheels which decrease in speed below that corresponding to vehicle speed, and means for preventing operation of said releasing means below a chosen rate of retardation of the vehicle.

55. In vehicle brake control means, fluid pressure braking means, electromagnetic valve means to supply fluid pressure to said braking means, an energizing circuit for said valve, normally closed electromagnetically operable means to retain the fluid pressure in said braking means, wheel speed responsive switch means automatically operable upon destruction of wheel traction to open said fluid pressure retaining valve means to reduce the braking pressure, and a control switch in the supply valve energizing circuit selectively manually operable, when said fluid pressure retaining means is closed to supply fluid pressure to said braking means, to retain it therein or to release it therefrom.

JOSEPH C. McCUNE.